United States Patent
Connors et al.

(10) Patent No.: US 8,219,146 B2
(45) Date of Patent: Jul. 10, 2012

(54) AUDIO-ONLY USER INTERFACE MOBILE PHONE PAIRING

(75) Inventors: Kirstin Connors, San Diego, CA (US); Frederick W. Ansfield, San Diego, CA (US)

(73) Assignee: Sony Corporation, Tokyo (JP)

( * ) Notice: Subject to any disclaimer, the term of this patent is extended or adjusted under 35 U.S.C. 154(b) by 99 days.

(21) Appl. No.: 12/917,034

(22) Filed: Nov. 1, 2010

(65) Prior Publication Data

US 2011/0111741 A1    May 12, 2011

Related U.S. Application Data

(60) Provisional application No. 61/258,771, filed on Nov. 6, 2009.

(51) Int. Cl.
*H04B 1/38* (2006.01)
(52) U.S. Cl. .................. 455/557; 455/414.3; 455/556.1
(58) Field of Classification Search .............. 455/66.1, 455/344, 556.1, 575.1, 95, 550.1, 557
See application file for complete search history.

(56) References Cited

U.S. PATENT DOCUMENTS

| | | | |
|---|---|---|---|
| 7,072,686 B1 | 7/2006 | Schrager | |
| 2004/0224675 A1* | 11/2004 | Puskoor et al. | 455/419 |
| 2005/0213742 A1* | 9/2005 | Fukuzawa | 379/265.02 |
| 2006/0003785 A1* | 1/2006 | Zatezalo | 455/519 |
| 2007/0189128 A1* | 8/2007 | Chung | 369/7 |
| 2007/0207796 A1 | 9/2007 | Yan | |
| 2007/0208563 A1 | 9/2007 | Rothschild | |
| 2008/0031475 A1* | 2/2008 | Goldstein | 381/151 |
| 2008/0133231 A1 | 6/2008 | Doulton | |
| 2008/0141313 A1* | 6/2008 | Kato et al. | 725/62 |
| 2008/0304573 A1* | 12/2008 | Moss et al. | 375/240.28 |
| 2009/0052636 A1 | 2/2009 | Webb et al. | |
| 2009/0081999 A1* | 3/2009 | Khasawneh et al. | 455/416 |
| 2009/0082062 A1* | 3/2009 | Boyaci et al. | 455/557 |

(Continued)

FOREIGN PATENT DOCUMENTS

CN        1247347        3/2000

(Continued)

OTHER PUBLICATIONS

Anonymous, "Mitel Unified Communicator Mobile," Mitel Networks Corporation, © 2001-2009.

*Primary Examiner* — Dominic E Rego
(74) *Attorney, Agent, or Firm* — Miller Patent Services; Jerry A. Miller

(57) ABSTRACT

Address book content information and an input command set are synchronized by an audio-only user interface mobile phone with a mobile device pairing server, such that the address book content information and the input command set of the audio-only user interface mobile phone are synchronized with a display-based mobile phone and the audio-only user interface mobile phone is synchronized with the display-based mobile phone via a shared unified single telephone number. The synchronized address book content information and the synchronized input command set are stored. Audio voice input information is detected. A command associated with the stored input command set is identified within the detected audio voice input information, and the identified command is processed. Audio output is generated confirming that processing associated with the identified command is in process. This abstract is not to be considered limiting, since other embodiments may deviate from the features described in this abstract.

20 Claims, 8 Drawing Sheets

U.S. PATENT DOCUMENTS

| | | | |
|---|---|---|---|
| 2009/0197539 A1* | 8/2009 | Shiba | 455/67.11 |
| 2009/0305632 A1* | 12/2009 | Sarkissian et al. | 455/41.2 |
| 2010/0118158 A1* | 5/2010 | Boland et al. | 348/211.2 |
| 2010/0214148 A1* | 8/2010 | Kuhn | 342/20 |
| 2010/0215170 A1* | 8/2010 | Kannappan | 379/418 |
| 2010/0297929 A1* | 11/2010 | Harris | 455/1 |
| 2010/0330908 A1* | 12/2010 | Maddern et al. | 455/41.2 |

FOREIGN PATENT DOCUMENTS

| | | |
|---|---|---|
| EP | 1121828 | 8/2001 |
| WO | WO 00/21306 | 4/2000 |
| WO | WO 2009/004415 | 1/2009 |

* cited by examiner

AUDIO-ONLY USER INTERFACE MOBILE PHONE PAIRING

CROSS REFERENCE TO RELATED DOCUMENTS

This application claims priority to and claims the benefit of U.S. Provisional Patent Application Ser. No. 61/258,771 titled "HANDS-FREE DISPLAY-FREE WIRE-FREE CELL PHONE," which was filed in the United States Patent Office on Nov. 6, 2009, and which is incorporated herein by reference in its entirety.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Wireless mobile phones, such as cell phones, provide communication capabilities for users. As a user travels with a mobile phone, a handoff occurs between cell towers to allow potentially uninterrupted service. Mobile phone manufacturers have gravitated toward display-rich mobile phones with touchscreen capabilities and downloadable graphical user interface applications that cover a broad range of graphical user interface needs of consumers.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
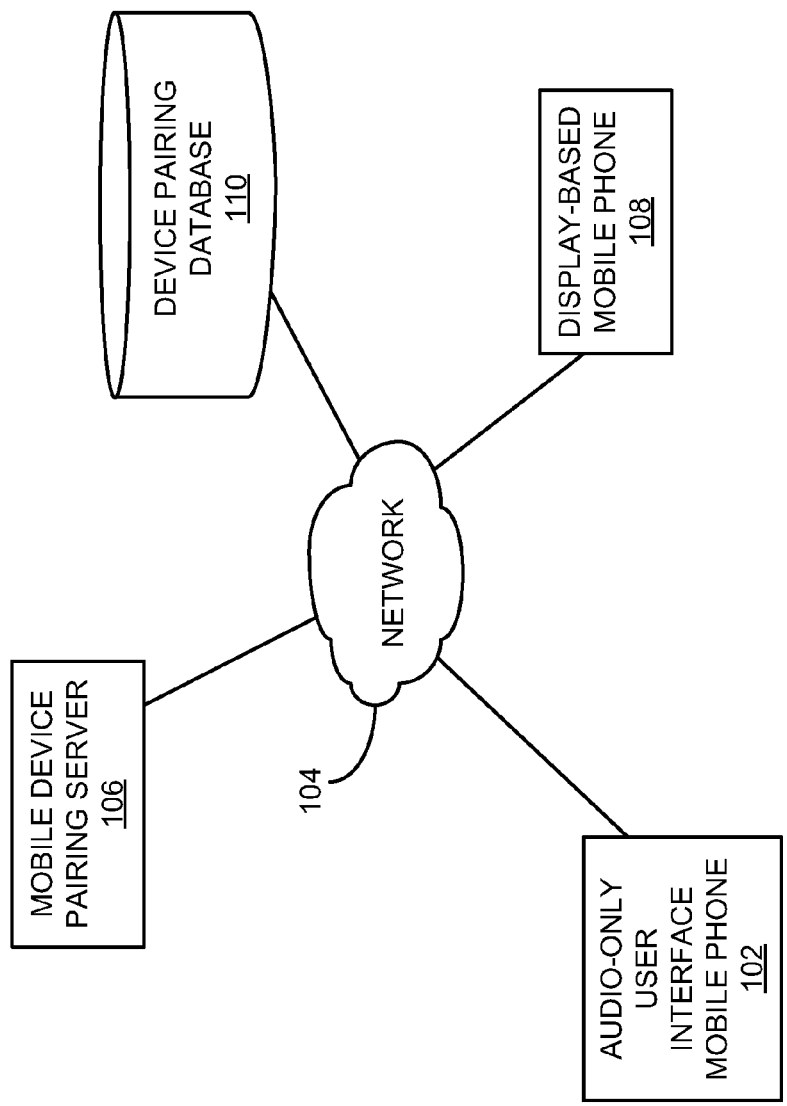
FIG. 1 is a block diagram of an example of an implementation of a system that provides automated audio-only user interface mobile phone pairing consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system having one or more processors.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The present subject matter provides automated audio-only user interface mobile phone pairing. For purposes of the present description, "pairing" may be considered pairing between two or more mobile devices, where one of the mobile devices is an audio-only user interface mobile phone. Based upon the present subject matter, an audio-only user interface mobile phone (i.e., a phone that has no alphanumeric or graphic display and that uses only audio for command input and audible communication output) may be paired and synchronized with a display-based mobile phone (i.e., a more conventional mobile phone having a display and possibly an electromechanical keyboard or touchscreen display). The audio-only user interface mobile phone may be considered herein an audio-only input and audio-only output mobile phone for user interface needs, and may be considered a hands-free displayless mobile phone. As such, the audio-only user interface mobile phone does not include a keypad or display for user input or output, respectively, or a touchscreen display for user input and ouptut.

However, it should be understood that, while the present description utilizes only audio for user input and user output purposes, the audio-only user interface mobile phone described herein does not exclude a minimal non-audio-based output for battery level, or for a power-on/power-off condition or status, or for other purposes that are not associated with the operational input and output for user interface functionality. Further, any such minimal non-audio-based output would not depart from the scope of the audio-only user interface mobile phone described herein. As such, based upon the given implementation, audio indications of battery level, power-on activity, power-off activity, or other indications that are not generally user-interface oriented may be provided, or these non-user-interface outputs may be provided by status indicators, such as one or more light-emitting diodes (LEDs) or other output, without departure from the scope of the present subject matter.

Given the reduced components (e.g., no display or keypad, or related circuitry), the audio-only user interface mobile phone may also be considered a reduced cost device. When paired and synchronized with a display-based mobile phone, a user may select either phone for a given use on a given day and the phones may seamlessly operate via a unified telephone number and automated context switching to allow flexibility for the user based upon planned activities for a given event.

For example, if a user is planning a boating trip and prefers to avoid the risk of dropping an expensive display-based mobile phone into the water, the audio-only user interface mobile phone may be selected for that event. Telephone call routing may be automatically transitioned from the display-based mobile to the audio-only user interface mobile phone for the event. Should the audio-only user interface mobile phone be dropped in the water or otherwise rendered inoperative or lost, call routing may be automatically transitioned back to the display-based mobile phone without service interruption for the user. Additionally, the audio-only user interface mobile phone may be used in other environments, such as at a gym, and may be manufactured with a sleek form factor without the bulk and weight associated with a large display and keypad or a large touchscreen display. As such, the user may receive and make telephone calls in such an environment using the more lightweight audio-only user interface mobile phone during such activities, again without concern for damage to a primary display-based mobile phone.

The audio-only user interface mobile phone may be paired and synchronized with a display-based mobile phone, for example, by use of a mobile device pairing server for synchronizing address book content, call routing, and other features associated with one or more user accounts between the two devices. The mobile device pairing server may include a home network server, such as a digital network living alliance (DLNA) server, or other home server, or may include any other wireless connectivity or routing device, as appropriate for a given implementation. The mobile device pairing server may also include remote servers, such as a data back-up server (e.g., Google® or other server).

It should be understood that while the audio-only user interface mobile phone eliminates use of a keypad and display for information input and output, respectively, the audio-only user interface mobile phone may include a broad set of features. Additional features may be provided to allow the user to maintain text messaging capabilities, Internet search capabilities, and other features, such as features available via the paired and synchronized display-based mobile phone or the one or more user accounts. For example, an audio-only user interface mobile phone may detect audio voice input information and may process that information to identify audio-based commands received from the user. These audio-based commands may be identified within a stored command set and may be executed to invoke the respective functionality.

The command set may be synchronized at functionality handover, periodically, or upon request (e.g., in response to such a command) via the mobile device pairing server. The command set may also be synchronized along with address book content and other information associated with a user wireless account.

Processing of the detected audio voice input may include, for example, speech recognition processing, audio-to-text conversion processing, or other processing as appropriate for a given implementation. Commands may be stored internally either in audio format or text format for comparison and processing. For internal command processing, speech recognition or audio-to-text conversion may be utilized to identify the command within the detected audio voice input information, depending upon a storage format for the command set. As such, where the command set is stored in an audio format, speech recognition may be used for comparison with the stored audio-based command set to identify a detected audio voice command. Alternatively, where the command set is stored text-based command set, audio-to-text conversion may be utilized to convert the detected audio voice command to text for comparison with the stored text-based command set. Audio output, such as user feedback or instructions, may be generated via text-to-audio processing where the feedback or instructions are stored in text format, or may include direct output of stored audio feedback or instructions.

As described above, several features may be made available via the audio-only user interface mobile phone, such as text messaging, Internet searching, and other features. Using text messaging as an example, where the detected command includes a command to send a text message to a contact, additional processing of the detected audio voice input information may be performed to identify a contact name and text message content within the detected audio voice input information. For example, a user may speak a command sequence such as "send text message to John confirming lunch at noon today." In response to detecting this audio voice input information, the audio-only user interface mobile phone may process the audio voice input information to identify the command "send text message," the contact name "John," and the content to be sent within the text message of "confirming lunch at noon today." In response to identifying the respective parts of the detected audio voice input information, the audio-only user interface mobile phone may look up contact information for the contact John and execute the identified command to send a text message to John, including the identified text message content. Alternatively, the user may speak the command "send text message," and the audio-only user interface mobile phone may prompt the user for the contact name and text message content via an audio-based prompt. Such an implementation may be useful to provide the user with interactive feedback. In either implementation, the audio-only user interface mobile phone may respond with an audio-based confirmation that the text message has been sent in response to sending the requested text message.

Similar processing may be performed in response to determining the identified command comprises a command to place a telephone call to the contact. Additionally similar processing may be performed in response to determining that the identified command comprises a command to perform a search via the Internet. Further, similar processing may be performed in response to a command to change address content information associated with a contact, or a command to switch incoming call ring activity from the audio-only user interface mobile phone to the paired and synchronized display-based mobile phone, or vice versa, or for any other command appropriate for a given implementation. In any such situation, the audio-only user interface mobile phone again may respond to the user by generating audio output confirming detection of the requested command and providing an indication that processing has begun or has been completed.

For example, for a situation where the detected input command includes a command to place a telephone call to the contact, audio output may be generated confirming that a call to the contact is in process, such as generating audio output in the form of voice-based audio output "calling John." Voice-based audio output may be default machine-generated audio voice output or may be generated based upon recorded audio content, such as recorded content of the user's voice, the voice of a companion of the user, or the voice of any other person. As such, the audio-only user interface mobile phone may output audio prompts and audio command confirmations in a human-sounding voice that the user prefers to hear. The audio-only user interface mobile phone may also generate audio tones or other audible sounds or sequences as prompts and command confirmations. Many possibilities exist for audio output generation, and all are considered within the scope of the present subject matter.

For certain input command processing resulting in an outgoing communication, such as text messaging or performing an Internet search, a message or other content may be received. For example, responsive to sending a text message or initiating/performing an Internet search, a response text message from the contact or search results from the Internet search may be received by the audio-only user interface mobile phone. In response to receipt of this content, perhaps in text format for either example, the audio-only user interface mobile phone may convert the received text to generated audio content information. This generated audio content information may be output to the user along with an indication of the content received. The generated audio content information may be created, for example, via audio-to-text conversion of the received text-based information.

For the received text message example, audio output of the form "text message received from John confirming lunch today at noon" may be generated and output in response to receipt of a text message from John confirming the same, with potential variation based upon the actual content of such a message. For the received Internet search results example, audio output such as "forty search results, first result, pizza restaurant located at restaurant square" may be generated and output in response to receipt of Internet search results, again with potential variation based upon the actual content of the first search result. The user may further be prompted via additional audio output for the device to determine whether to output additional search result content to the user. The user may respond to a generated audio output prompt with an additional voice command, such as "next search result." Alternatively, the user may initiate a command, such as for example "next result" to indicate a request for output of the next search result. Such processing may continue until the user either speaks a command to terminate search result output or does not respond to an audio output prompt or indicate a request for a next search result for a configured time period, such as for example three (3) seconds, five (5) seconds, etc. as appropriate for a given implementation.

Synchronization with the mobile device pairing server may be performed, for example, by sending a synchronization request message to the mobile device pairing server, such as, in response to detection of a voice command via the audio-only user interface mobile phone to synchronize with the mobile device pairing server. Additionally, capacitive coupling, resistive coupling, button press detection, or other technology may be used to sense or detect a human hand contact on an enclosure of the audio-only user interface mobile phone to allow automated synchronization in response to the user picking up the audio-only user interface mobile phone for use. Many other possibilities exist for initiating and coordinating synchronization with the mobile device pairing server and all are considered within the scope of the present subject matter.

Turning now to FIG. 1, FIG. 1 is a block diagram of an example of an implementation of a system 100 that provides automated audio-only user interface mobile phone pairing. An audio-only user interface mobile phone 102 interconnects via a network 104 to a mobile device pairing server 106. As described in more detail below, the mobile device pairing server 106 coordinates pairing between the audio-only user interface mobile phone 102 and a display-based mobile phone 108. The mobile device pairing server 106 may include a home network server, such as a digital living network alliance (DLNA) server or other server as appropriate for a given implementation. A device pairing database 110 stores device pairing information, such as a unified telephone number that selectively rings one of the audio-only user interface mobile phone 102 and the display-based mobile phone 108, as selected by detection of user inputs via either of the audio-only user interface mobile phone 102 and the display-based mobile phone 108.

The device pairing database 110 may be co-located with the mobile device pairing server 106, or the stored information may be passed between the respective audio-only user interface mobile phone 102 and the display-based mobile phone 108 in response to activation of either device for processing of calls and other information. It is further understood that the mobile device pairing server 106 is shown as a separate component for ease of description purposes. However, the mobile device pairing server 106 may form a portion of the audio-only user interface mobile phone 102 and/or the display-based mobile phone 108 without departure from the scope of the present subject matter as appropriate for a given implementation.

The network 104 may include any form of interconnection suitable for the intended purpose, including a private or public network such as an intranet or the Internet, respectively, direct inter-module interconnection, dial-up, wireless, or any other interconnection mechanism capable of allowing communication between devices. An example of a web-based protocol suitable for providing communication over the network 104 is the transmission control protocol over Internet protocol (TCP/IP). Markup language formatting, such as the hypertext transfer protocol (HTTP) and extensible markup language (XML) formatting, may be used for messaging over the TCP/IP connection with devices accessible via the network 104.

Other web protocols exist and all are considered within the scope of the present subject matter.

The subject matter described herein may be performed in real time to allow seamless integration of the audio-only user interface mobile phone 102 and the display-based mobile phone 108 via the mobile device pairing server 106. For purposes of the present description, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art.

Figure 2:
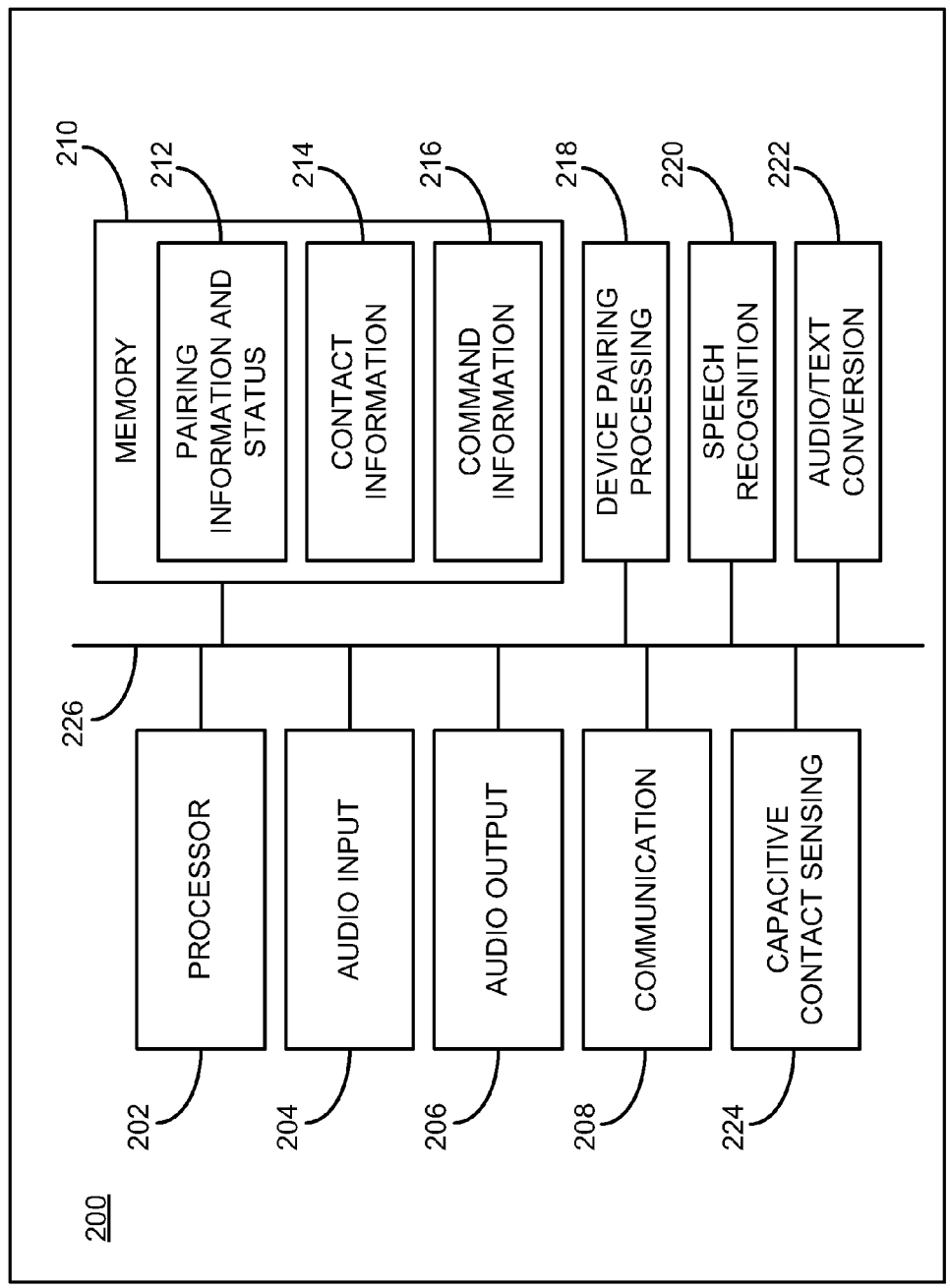
FIG. 2 is a block diagram of an example of an implementation of a core processing module that provides automated audio-only user interface mobile phone pairing consistent with certain embodiments of the present invention.

FIG. 2 is a block diagram of an example of an implementation of a core processing module 200 that provides automated audio-only user interface mobile phone pairing. The core processing module 200 represents a general module that may form a portion of any of the audio-only user interface mobile phone 102, the display-based mobile phone 108, or the mobile device pairing server 106, with potential modifications as appropriate for a given implementation. The particular functionality of the core processing module 200 may differ in functionality based upon which device the core processing module 200 is associated with. For example, while certain of the examples below detail processing of the audio-only user interface mobile phone 102, it is understood that complementary processing may be performed on the other devices, such as the display-based mobile phone 108 and the mobile device pairing server 106, in response to the processing described for the audio-only user interface mobile phone 102. As such, it is understood that all such processing is considered within the scope of the present subject matter.

A processor 202 provides computer instruction execution, computation, and other capabilities within the core processing module 200. An audio input device 204 provides input capabilities for the user. The audio input device 204 may include a microphone and signal processing circuitry as appropriate for a given implementation.

An audio output device 206 provides audio output capabilities for the core processing module 200, such as audio output prompts, audio output based upon received content information, and audio output command confirmations. The audio output device 206 may include a speaker, driver circuitry, and interface circuitry as appropriate for a given implementation.

A communication module 208 provides communication capabilities for interaction with the core processing module 200, such as for sending and receiving text messages, performing Internet searches and receiving results, or other activities as appropriate for a given implementation. The communication module 208 may support wired or wireless standards as appropriate for a given implementation. Example wired standards include Internet video link (IVL) interconnection within a home network, for example such as Sony Corporation's Bravia® Internet Video Link (BIVL™). Example wireless standards include cellular wireless communication and Bluetooth® wireless communication standards. Many other wired and wireless communication standards are possible and all are considered within the scope of the present subject matter.

A memory 210 includes a pairing information and status storage area 212. The pairing information and status storage area 212 may store identification information that identifies one or more paired and synchronized mobile phones, a mobile device pairing server, or other identification information. Additionally, a pairing status indication that represents a present status of pairing between two such devices may be stored. An example of a pairing/synchronization status may be "local active," "remote active," "local ringing," "paired device ringing," "synchronization in process," "synchronization completed," or any other status appropriate for a given implementation and state of processing between two devices. The pairing/synchronization status indication may be provided to a user of either the paired audio-only user interface mobile phone 102 as audio output or the display-based mobile phone 108 as visual or audio output, or utilized by the mobile device pairing server 106, and may represent a current configuration between the respective devices.

The memory 210 also includes a contact information storage area 214 that stores address book and other information associated with contacts. This information may be created or modified by any of the audio-only user interface mobile phone 102, the display-based mobile phone 108, and the mobile device pairing server 106, and may be synchronized between the respective devices via the mobile device pairing server 106.

The memory 210 also includes a command information storage area 216 that stores command information for commands detected and received via the core processing module 200. For an implementation of the core processing module 200 associated with the audio-only user interface mobile phone 102 or the display-based mobile phone 108, the command information may be created or modified in response to detected input from a user via either mobile phone, or may be received from the mobile device pairing server 106 during a synchronization event. For an implementation of the core processing module 200 associated with the mobile device pairing server 106, the command information may be received from one of the audio-only user interface mobile phone 102 or the display-based mobile phone 108, and synchronized with the respective other device. The command information may also include stored samples of a user voice or a voice of a friend that may be used for comparison with detected audio commands or for generation of prompts or other output as described above and in more detail below. As described above, the command information may be stored in text format, audio format, a combination of audio and text format, or other format as appropriate for a given implementation. Many possibilities exist for creation or storage of command information and all are considered within the scope of the present subject matter.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area without departure from the scope of the present subject matter.

A device pairing processing module 218 is also illustrated. The device pairing processing module 218 provides processing capabilities for command interpretation, audio output generation, mobile device pairing server synchronization (again as appropriate for the respective device upon which the core processing module 200 is implemented) and other processing as described above and in more detail below. The device pairing processing module 218 implements the automated audio-only user interface mobile phone pairing of the core processing module 200.

A speech recognition module 220 may process detected and received audio input via the audio input device 204, and may output one or more indications of detected speech patterns. The device pairing processing module 218 may utilize this output to identify spoken commands received from a user. Alternatively, the speech recognition module 220 may provide command indications to the device pairing processing module 218 for processing in response to speech recognition processing as appropriate for a given implementation.

An audio/text conversion module 222 may convert audio to text and may convert text to audio. As such, the audio/text conversion module 222 may process detected and received audio input from the audio input device 204 and output one or more indications of detected speech patterns as text. The device pairing processing module 218 may utilize this output to identify spoken commands received from a user. Alternatively, the audio/text conversion module 222 may provide command indications to the device pairing processing module 218 for processing in response to speech recognition processing as appropriate for a given implementation. Additionally, the audio/text conversion module 222 may convert received text, such as text-based Internet search results, to audio format and output them to either the device pairing processing module 218 or directly to the user via the audio output device 206.

Many other possibilities exist for processing associated with the speech recognition module 220 and the audio/text conversion module 222, and interactions between these modules and the device pairing processing module 218. Accordingly, all such variations are considered within the scope of the present subject matter.

A capacitive contact sensing module 224 provides human contact sensing for an enclosure of the audio-only user interface mobile phone 102. It is understood that capacitive sensing technology may be used to determine that a user of the audio-only user interface mobile phone 102 has touched the device, such as within a charging cradle or on a table, to pick the device up for use. Accordingly, the capacitive contact sensing module 224 may be used by the device pairing processing module 218 to detect a human hand contact on an enclosure of the audio-only user interface mobile phone 102.

Though certain of the modules described above, such as the device pairing processing module 218, the speech recognition module 220, the audio/text conversion module 222, the communication module 208, and the capacitive contact sensing module 224, or other modules, are illustrated as component-level modules for ease of illustration and description purposes, it should be noted that the respective modules may include any hardware, programmed processor(s), and memory used to carry out the functions of this module as described above and in more detail below. For example, these modules may include additional controller circuitry in the form of application specific integrated circuits (ASICs), processors, antenna(s), and/or discrete integrated circuits and components for performing communication and electrical control activities associated with the respective devices. Additionally, these modules may also include interrupt-level, stack-level, and application-level modules as appropriate. Furthermore, these modules may include any memory components used for storage, execution, and data processing for performing processing activities associated with the module.

It should also be noted that the device pairing processing module 218 may form a portion of other circuitry described without departure from the scope of the present subject matter. Further, the device pairing processing module 218 may alternatively be implemented as an application stored within the memory 210. In such an implementation, the device pairing processing module 218 may include instructions executed by the processor 202 for performing the functionality described herein. The processor 202 may execute these instructions to provide the processing capabilities described above and in more detail below for the core processing module 200. The device pairing processing module 218, the speech recognition module 220, and the audio/text conversion module 222 may form a portion of an interrupt service routine (ISR), a portion of an operating system, a portion of a browser application, or a portion of a separate application without departure from the scope of the present subject matter. It should additionally be noted that the device pairing processing module 218, the speech recognition module 220, and the audio/text conversion module 222 may be implemented as a single module without departure from the scope of the present subject matter.

The processor 202, the audio input device 204, the audio output device 206, the communication module 208, the memory 210, the device pairing processing module 218, the speech recognition module 220, the audio/text conversion module 222, and the capacitive contact sensing module 224 are interconnected via one or more interconnections shown as interconnection 226 for ease of illustration. The interconnection 226 may include a system bus, a network, or any other interconnection capable of providing the respective components with suitable interconnection for the respective purpose.

Figure 3:
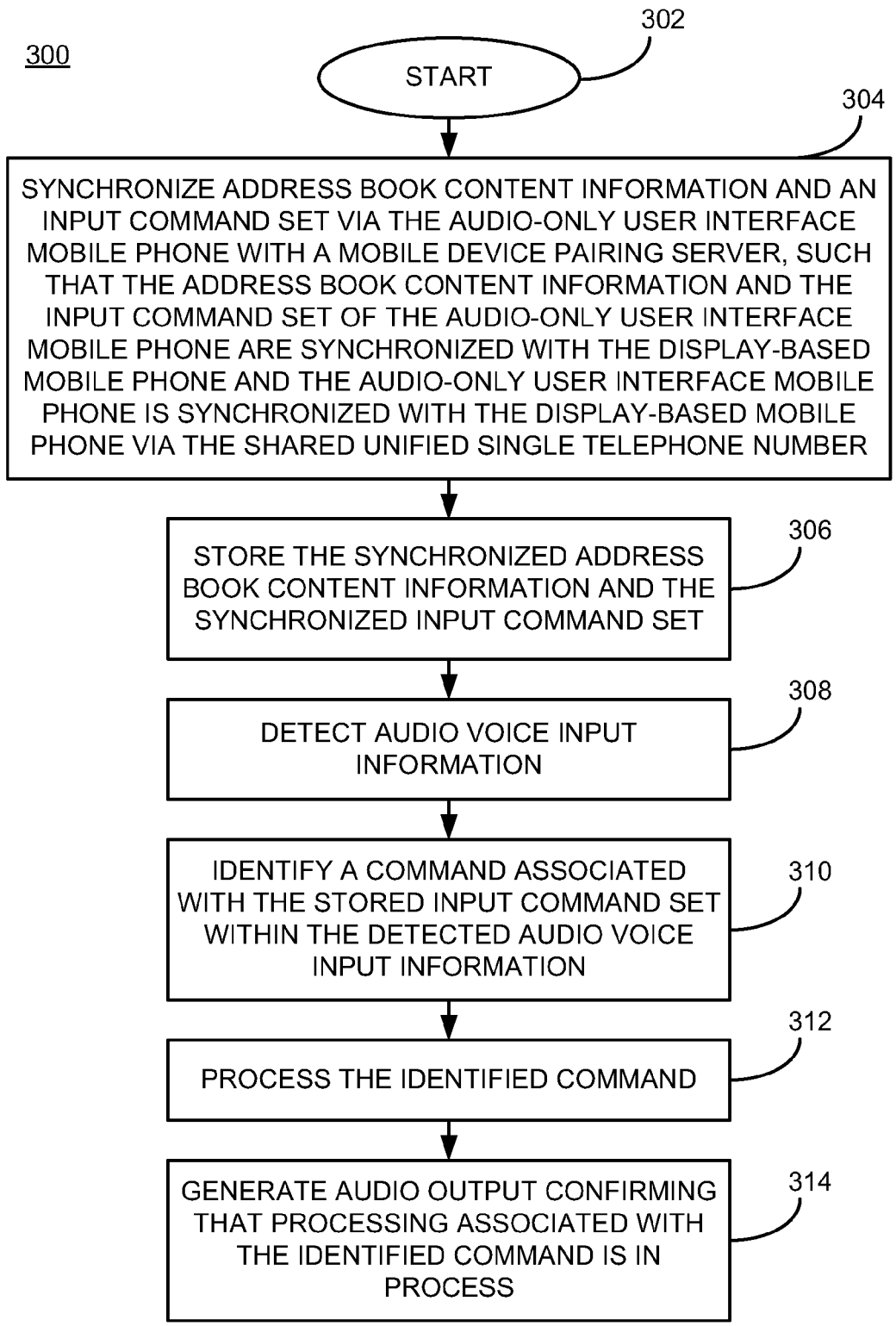
FIG. 3 is a flow chart of an example of an implementation of a process that provides automated audio-only user interface mobile phone pairing consistent with certain embodiments of the present invention.
Figure 4A:
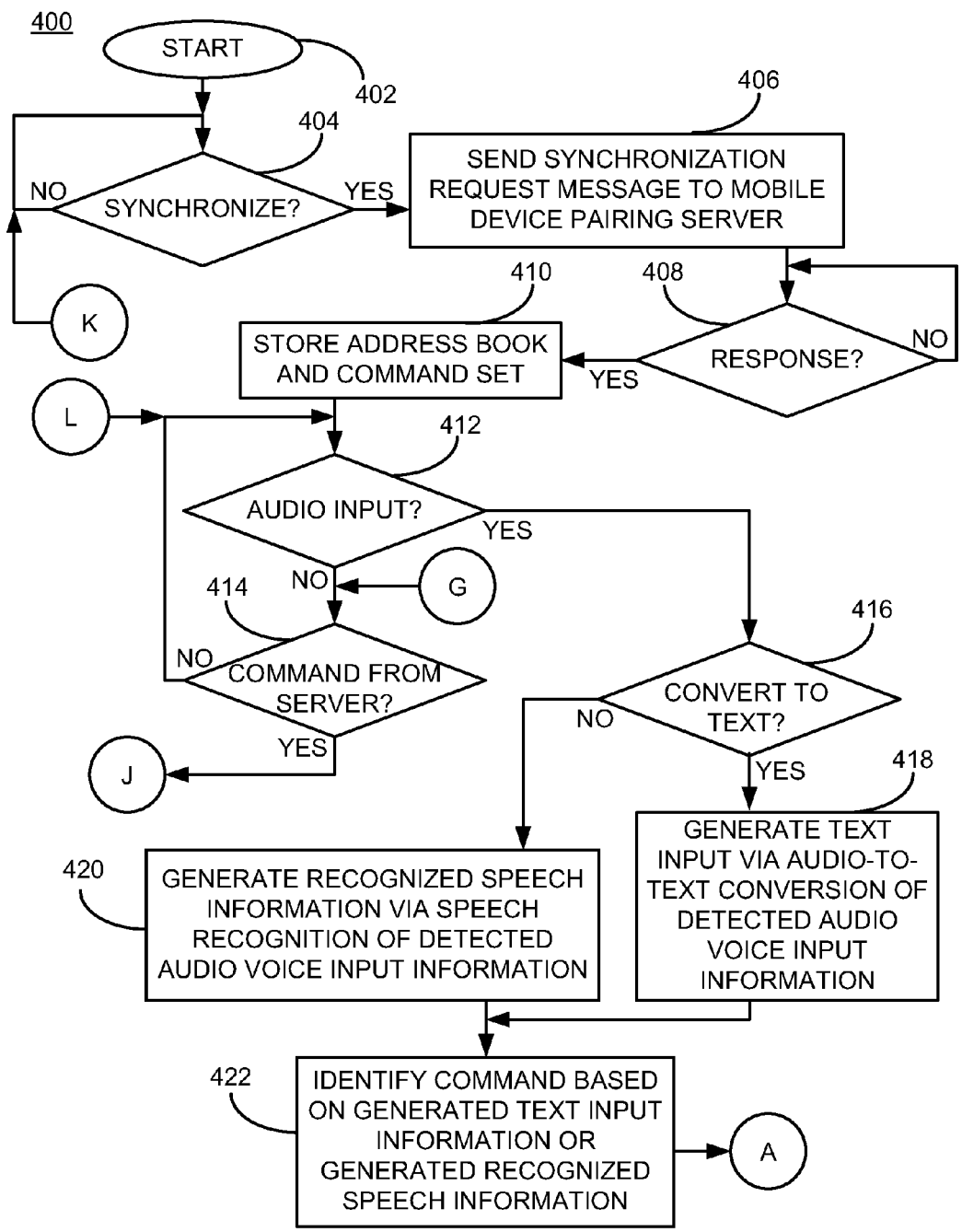
FIG. 4A is a flow chart of an example of an implementation of initial higher-level processing within a process that provides automated audio-only user interface mobile phone pairing via an audio-only user interface mobile phone consistent with certain embodiments of the present invention.
Figure 4B:
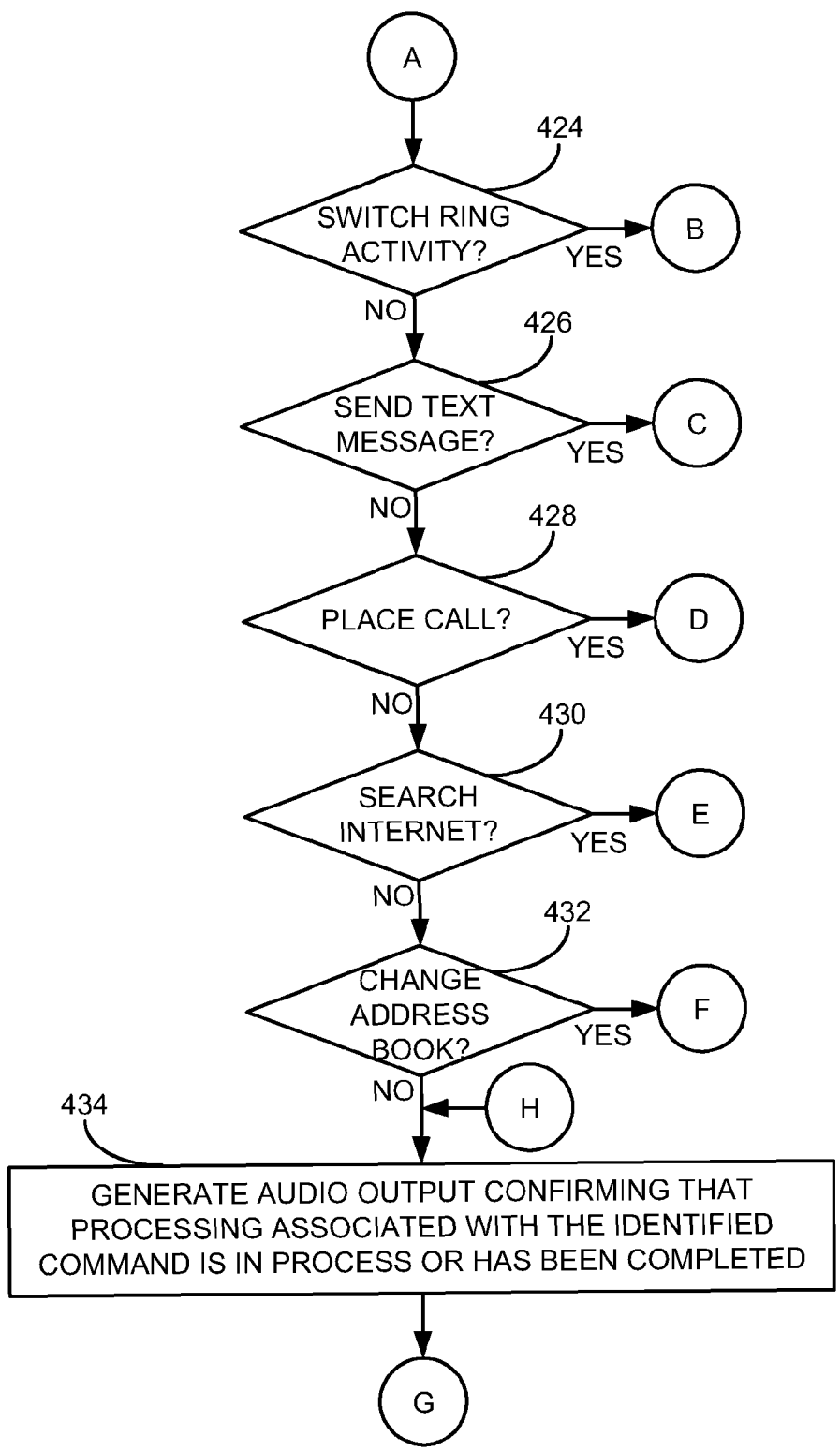
FIG. 4B is a flow chart of an example of an implementation of a second portion of higher-level processing associated with a process that provides automated audio-only user interface mobile phone pairing via an audio-only user interface mobile phone consistent with certain embodiments of the present invention.
Figure 4C:
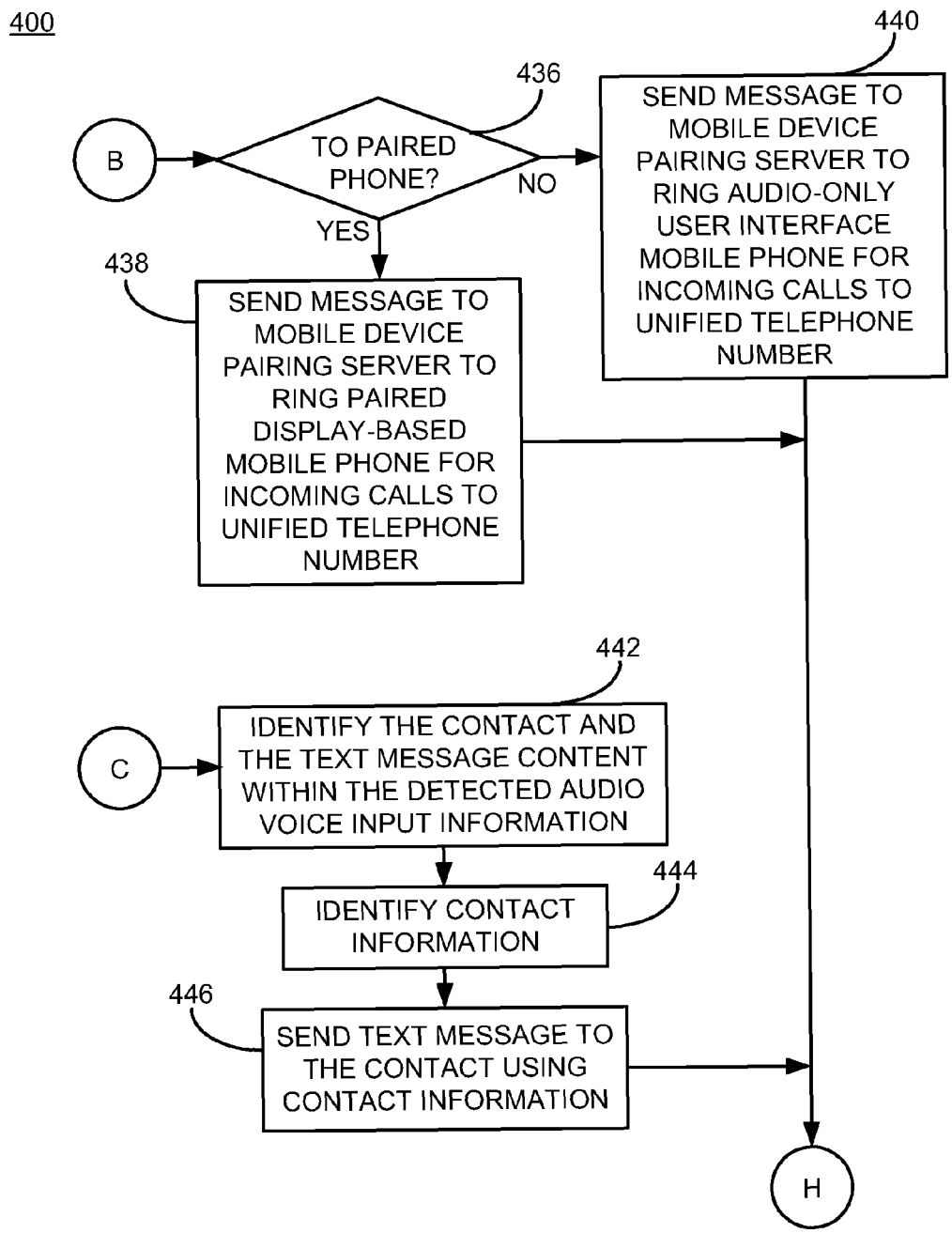
FIG. 4C is a flow chart of an example of an implementation of a third portion of processing associated with a process that provides automated audio-only user interface mobile phone pairing via an audio-only user interface mobile phone consistent with certain embodiments of the present invention.
Figure 4D:
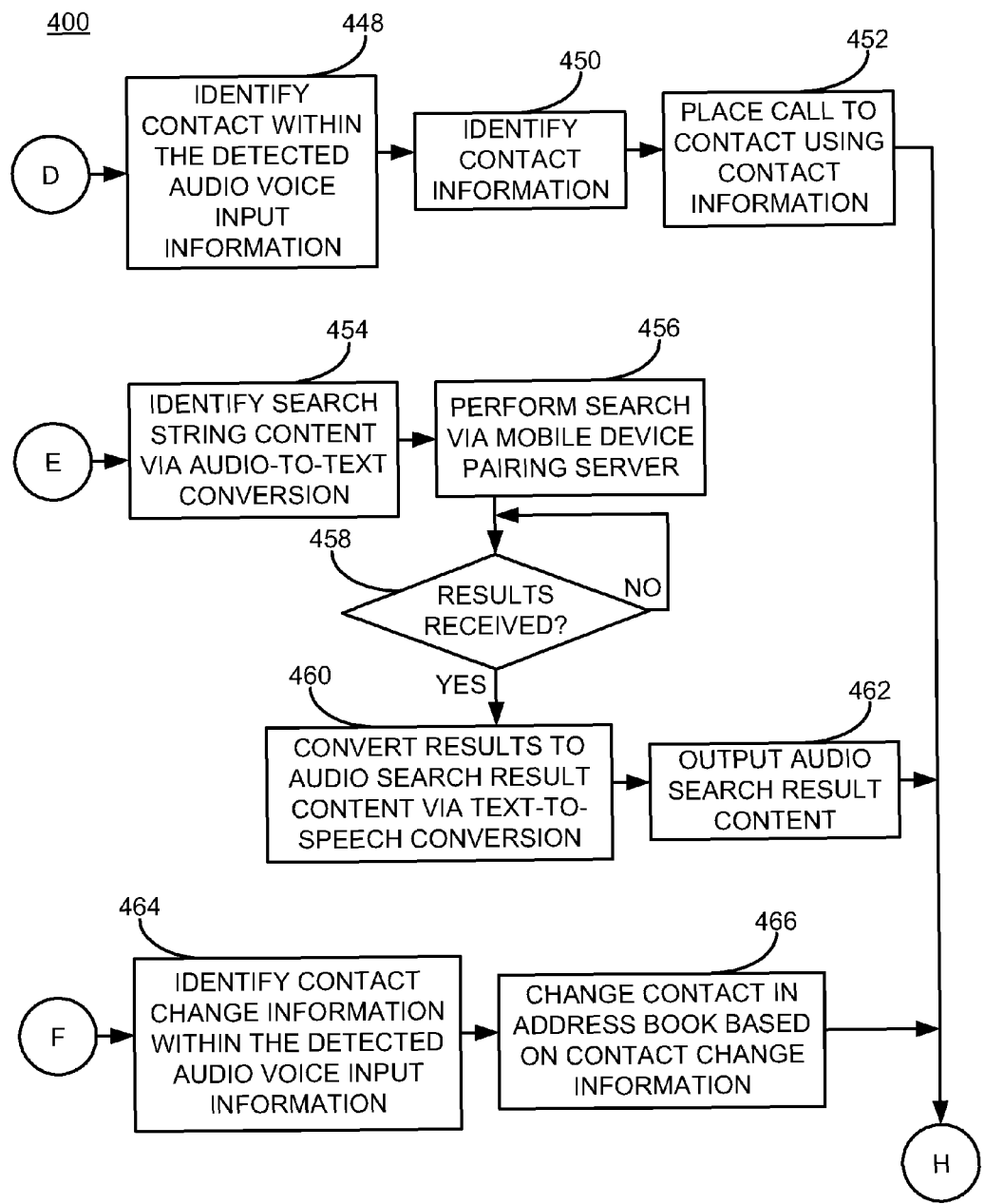
FIG. 4D is a flow chart of an example of an implementation of a fourth portion of processing associated with a process that provides automated audio-only user interface mobile phone pairing via an audio-only user interface mobile phone consistent with certain embodiments of the present invention.
Figure 4E:
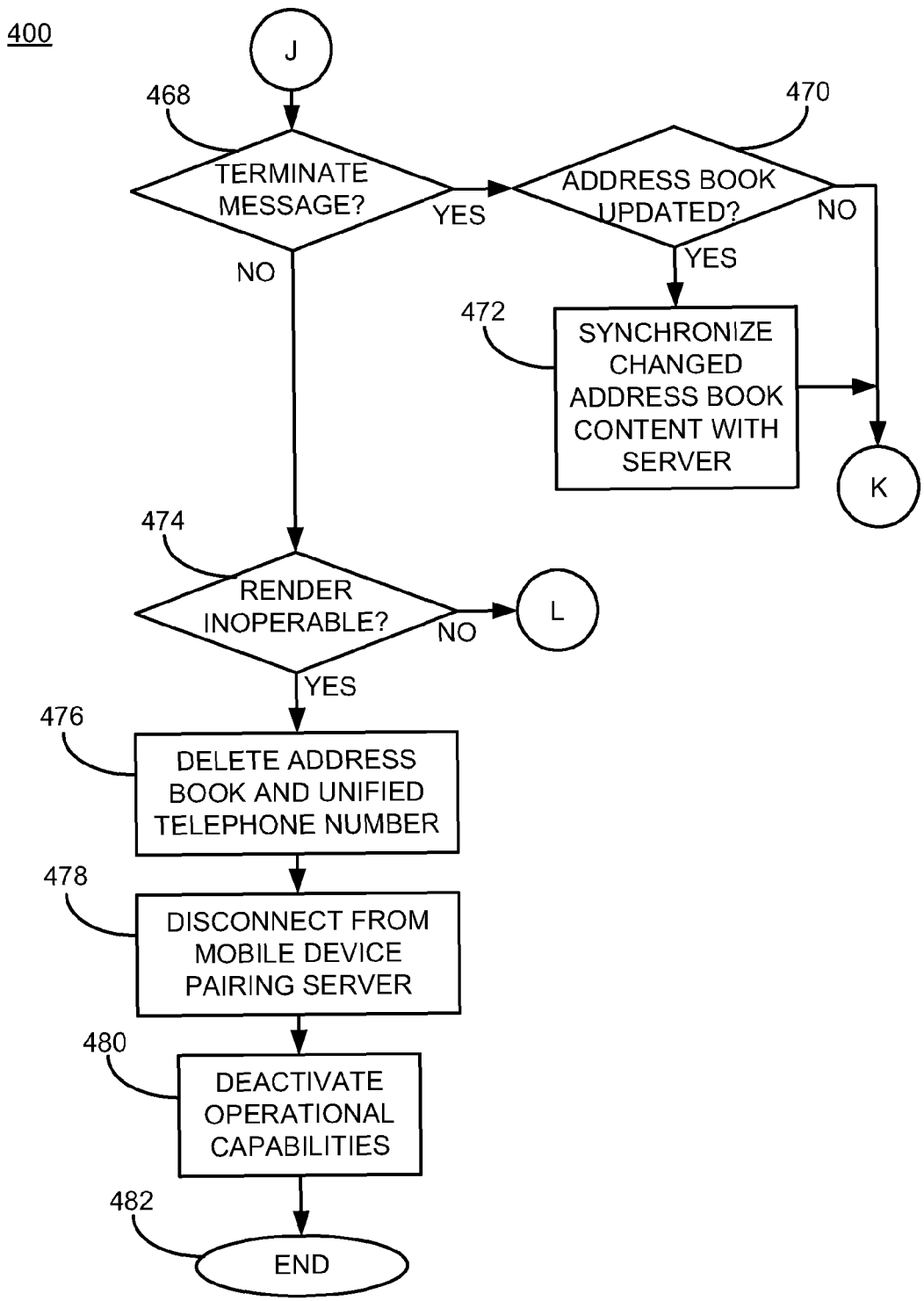
FIG. 4E is a flow chart of an example of an implementation of an additional portion of higher-level processing associated with a process that provides automated audio-only user interface mobile phone pairing via an audio-only user interface mobile phone consistent with certain embodiments of the present invention.

FIG. 3 through FIG. 4E below describe example processes that may be executed by such devices, such as the core processing module 200, to perform the automated audio-only user interface mobile phone pairing associated with the present subject matter. Many other variations on the example processes are possible and all are considered within the scope of the present subject matter. The example processes may be performed by modules, such as the device pairing processing module 218 (possibly in association with the speech recognition module 220 and/or the audio/text conversion module 222) and/or executed by the processor 202, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 that provides automated audio-only user interface mobile phone pairing. The process 300 starts at 302. At block 304, the process 300 synchronizes address book content information and an input command set via the audio-only user interface mobile phone with a mobile device pairing server, such that the address book content information and the input command set of the audio-only user interface mobile phone are synchronized with the display-based mobile phone and the audio-only user interface mobile phone is synchronized with the display-based mobile phone via the shared unified single telephone number. At block 306, the process 300 stores the synchronized address book content information and the synchronized input command set. At block 308, the process 300 detects audio voice input information. At block 310, the process 300 identifies a command associated with the stored input command set within the detected audio voice input information. At block 312, the process 300 processes the identified command. It should be understood that processing of the identified command may be performed locally on the core processing module 200, or may be performed by sending the command to a remote word detection and parser device. At block 314, the process 300 generates audio output confirming that processing associated with the identified command is in process.

FIG. 4A through FIG. 4E illustrate a flow chart of an example of an implementation of a process 400 that provides automated audio-only user interface mobile phone pairing via an audio-only user interface mobile phone, such as the audio-only user interface mobile phone 102. It is understood that complementary processing may be performed at a mobile phone device pairing server, such as the mobile device pairing server 106, and that similar processing may be performed at a display-based mobile phone, such as the display-based mobile phone 108. FIG. 4A illustrates initial higher-level processing within the process 400 and starts at 402. At decision point 404, the process 400 makes a determination as to whether to synchronize with a mobile device pairing server, such as the mobile device pairing server 106. The determination as to whether to synchronize with a mobile device pairing server may be made, for example, in response to capacitive detection of a human hand contact on an enclosure of an audio-only user interface mobile phone, such as the audio-only user interface mobile phone 102. Alternatively, the determination to synchronize with the mobile device pairing server 106 may be made in response to detection of an audio user voice input command to synchronize with the mobile device pairing server 106. In response to the capacitive detection of the human hand contact on the enclosure of the audio-only user interface mobile phone 102, or in response to identification of the audio user voice input command to synchronize with the mobile device pairing server 106, the process 400 sends a synchronization request message to the mobile device pairing server 106 at block 406.

At decision point 408, the process 400 makes a determination as to whether a response, including address book content and an input command set, has been received from the mobile device pairing server 106. In response to receiving the address book content and input command set from the mobile device pairing server 106, the process 400 stores the address book content information and the input command set, such as within the contact information storage area 214 and the command information storage area 216, respectively, at block 410.

At decision point 412, the process 400 makes a determination as to whether audio voice input information has been detected. Processing associated with an affirmative determination at decision point 412 that audio voice input information has been detected will be described in more detail below to complete a description of higher level processing within the process 400. As such, in response to determining that no audio voice input information has been detected, the process 400 makes a determination at decision point 414 as to whether a command from a mobile device pairing server, such as the mobile device pairing server 106, has been detected. Again, processing associated with an affirmative determination at decision point 414 that a command from a mobile device pairing server has been detected will be described in more detail below to complete the description of higher level processing within the process 400. As such, in response to determining that a command from a mobile device pairing server has not been detected, the process 400 returns to decision point 412 and iterates as described above.

Returning to the description of decision point 412, in response to detecting audio voice input information, the process 400 makes a determination as to whether to convert the audio voice input information to text at decision point 416. As described above, audio-to-text conversion may be performed or speech recognition may be performed on detected audio voice input information. Accordingly, in response to determining to convert the detected audio voice input information to text at decision point 416, the process 400 generates text input information via audio-to-text conversion of the detected audio voice input information at block 418. In response to determining not to convert the detected audio voice input information to text at decision point 416, the process 400 generates recognized speech information via speech recognition processing of the detected audio voice input information at block 420. In response to either generating text input information at block 418, or generating recognized speech information at block 420, the process 400 identifies a command based upon the generated text input information or the generated recognized speech information at block 422. The process 400 transitions to the processing shown and described in association with FIG. 4B through FIG. 4E below.

FIG. 4B illustrates a second portion of higher-level processing associated with the process 400 for automated audio-only user interface mobile phone pairing. At decision point 424, the process 400 makes a determination as to whether the identified command includes a command to switch incoming call ring activity either from the audio-only user interface mobile phone 102 to the display-based mobile phone 108, or vice versa. Processing associated with an affirmative determination at decision point 424 will be deferred and described in more detail below in association with FIG. 4C.

In response to determining at decision point 424 that the identified command does not include a command to switch incoming call ring activity either from the audio-only user interface mobile phone 102 to the display-based mobile phone 108, or vice versa, the process 400 makes a determination at decision point 426 as to whether the identified command includes a command to send a text message to a contact associated with the synchronized address book content information. Processing associated with an affirmative determination at decision point 426 will be deferred and described in more detail below in association with FIG. 4C.

In response to determining at decision point 426 that the identified command does not include a command to send a text message to a contact associated with the synchronized address book content information, the process 400 makes a determination at decision point 428 as to whether the identified command includes a command to place a telephone call to a contact associated with the address book content information. Processing associated with an affirmative determination at decision point 428 will be deferred and described in more detail below in association with FIG. 4D.

In response to determining at decision point 428 that the identified command does not include a command to place a telephone call to a contact associated with the address book content information, the process 400 makes a determination at decision point 430 as to whether the identified command includes a command to perform a search via the Internet. Processing associated with an affirmative determination at decision point 430 will be deferred and described in more detail below in association with FIG. 4D.

In response to determining at decision point 430 that the identified command does not include a command to perform a search via the Internet, the process 400 makes a determination at decision point 432 as to whether the identified command includes a command to change the stored address book content information associated with the contact. Processing associated with an affirmative determination at decision point 432 will be deferred and described in more detail below in association with FIG. 4D.

In response to determining at decision point 432 that the identified command does not include a command to change the stored address book content information associated with a contact, the process 400 generates audio output confirming that processing associated with the identified command is in process or has been completed at block 434. The process returns to decision point 414 within FIG. 4A and iterates as described above and below.

Returning to the description of decision point 424 within FIG. 4B, in response to determining that the identified command includes a command to switch incoming call ring activity either from the audio-only user interface mobile phone 102 to the display-based mobile phone 108, or vice versa, the process 400 transitions to the processing shown and described in association with FIG. 4C.

FIG. 4C illustrates a third portion of processing associated with the process 400 for automated audio-only user interface mobile phone pairing. With reference to the processing shown within FIG. 4C, the process 400 makes a determination at decision point 436 as to whether the identified command comprises a command to switch call ring activity from the audio-only user interface mobile phone 102 to the paired and synchronized display-based mobile phone 108 or from the display-based mobile phone 108 to the audio-only user interface mobile phone 102.

In response to determining that the command comprises a command to switch call ring activity from the audio-only user interface mobile phone 102 to the paired and synchronized display-based mobile phone 108, the process 400 sends a message to the mobile device pairing server 106 to ring the paired and synchronized display-based mobile phone 108 for incoming calls to the shared unified single telephone number at block 438. In response to determining at decision point 436 that the command does not comprise a command to switch call ring activity from the audio-only user interface mobile phone 102 to the paired and synchronized display-based mobile phone 108 (e.g., that the identified command is a command to switch incoming call ring activity from the paired and synchronized display-based mobile phone 108 to the audio-only user interface mobile phone 102), the process 400 sends a message to the mobile device pairing server 106 to ring the audio-only user interface mobile phone 102 for incoming calls to the shared unified single telephone number at block 440. Upon sending a message to the mobile device pairing server 106 to ring the paired and synchronized display-based mobile phone 108 at block 438, upon sending a message to the mobile device pairing server 106 to ring the audio-only user interface mobile phone 102 at block 440, the process 400 returns to block 434 within FIG. 4B and iterates as described above.

Returning to the description of decision point 426 within FIG. 4B, in response to determining that the identified command includes a command to send a text message to a contact associated with the synchronized address book content information, the process 400 transitions to the processing shown and described in association with FIG. 4C. With reference to the processing shown within FIG. 4C, the process 400 identifies the contact and the text message content within the detected audio voice input information at block 442. At block 444, the process 400 identifies contact information for the contact within the stored synchronized address book content information. At block 446, the process 400 sends the text message to the contact including the identified text message content using the identified contact information. The process 400 returns to block 434 within FIG. 4B and iterates as described above. It is understood that processing for receiving a response text message, converting text message content of the text message to audio format, and outputting the text message audio formatted content is not shown within the process 400 for ease of illustration purposes. However, it is understood that such processing is considered within the scope of the present subject matter, as described above.

Returning to the description of decision point 428 within FIG. 4B, in response to determining that the identified command includes a command to place a telephone call to a contact associated with the address book content information, the process 400 transitions to the processing shown and described in association with FIG. 4D.

FIG. 4D illustrates a fourth portion of processing associated with the process 400 for automated audio-only user interface mobile phone pairing. With reference to the processing shown within FIG. 4D, the process 400 identifies the contact within the detected audio voice input information at block 448. At block 450, the process 400 identifies contact information for the contact within the stored address book content information. At block 452, the process 400 places a telephone call to the contact using the identified contact information. It is also understood that an input command to terminate a placed telephone call may be processed in a similar fashion and a call may be disconnected. This additional processing is not illustrated within the process 400 to reduce complexity of the example processing. However, it is understood that such additional processing may be associated with a process, such as the process 400, without departure from the scope of the present subject matter. The process 400 returns to block 434 within FIG. 4B and iterates as described above.

Returning to the description of decision point 430 within FIG. 4B, in response to determining that the identified command includes a command to perform a search via the Internet, the process 400 transitions to the processing shown and described in association with FIG. 4D. With reference to the processing shown within FIG. 4D, the process 400 identifies search string content via audio-to-text conversion of the detected audio voice input information at block 454. At block 456, the process 400 performs an Internet search using the audio-to-text converted search string via the mobile device pairing server 106. At decision point 458, the process 400 makes a determination as to whether search results have been received from the mobile device pairing server 106. In response to receiving search result content from the mobile device pairing server 106, the process 400 converts the received search result content to audio search result content via text-to-speech conversion of the received search result content at block 460. At block 462, the process 400 outputs the audio search result content. The process 400 returns to block 434 within FIG. 4B and iterates as described above.

Returning to the description of decision point 432 within FIG. 4B, in response to determining that the identified command includes a command to change the stored address book content information associated with the contact, the process 400 transitions to the processing shown and described in association with FIG. 4D. With reference to the processing shown within FIG. 4D, the process 400 identifies contact change information within the detected audio voice input information at block 464. At block 466, the process 400 changes the stored address book content information associated with the contact based upon the contact change information. The process 400 returns to block 434 within FIG. 4B and iterates as described above.

Returning to the description of decision point 414 within FIG. 4A, in response to determining that a command from a mobile device pairing server 106 has been detected, the process 400 transitions to FIG. 4E.

FIG. 4E illustrates an additional portion of higher-level processing associated with the process 400 for automated audio-only user interface mobile phone pairing. With reference to the processing shown within FIG. 4E, the process 400 makes a determination at decision point 468 as to whether an instruction (e.g., message) has been received from the mobile device pairing server 106 to terminate active operation of the audio-only user interface mobile phone 102. In response to determining that an instruction has been received from the mobile device pairing server 106 to terminate active operation of the audio-only user interface mobile phone 102, the process 400 makes a determination at decision point 470 as to whether the address book content information was changed during the active operation of the audio-only user interface mobile phone 102. In response to determining that the address book content information was changed during the active operation of the audio-only user interface mobile phone 102, the process 400 synchronizes the changed address book content information via the audio-only user interface mobile phone 102 with the mobile device pairing server 106 at block 472. In response to completion of the synchronization with the mobile device pairing server 106 or upon determining at decision point 470 that the address book content information was not changed, the process 400 returns to decision point 404 shown within FIG. 4A and enters a synchronization detection mode that includes one of a capacitive human hand detection synchronization detection mode and a voice command synchronization detection mode.

Returning to the description of decision point 468 of FIG. 4E, in response to determining that an instruction to terminate active operation of the audio-only user interface mobile phone 102 has not been received from the mobile device pairing server 106, the process 400, makes a determination at decision point 474 as to whether an instruction has been received from the mobile device pairing server 106 to render the audio-only user interface mobile phone 102 inoperable. As described above, should the audio-only user interface mobile phone 102 (or the display-based mobile phone 108 for similar processing on that platform) be lost, stolen, or otherwise inaccessible, the user may request the mobile device pairing server 106 to instruct the respective mobile phone to render itself unusable.

In response to determining that an instruction has not been received from the mobile device pairing server 106 to render the audio-only user interface mobile phone 102 inoperable, the process 400 returns to decision point 412 shown in FIG. 4A and iterates as described above. In response to determining that an instruction has been received from the mobile device pairing server 106 to render the audio-only user interface mobile phone 102 inoperable at decision point 474, the process 400 deletes the address book content information and the unified telephone number from the audio-only user interface mobile phone 102 at block 476. At block 478, the process 400 disconnects the audio-only user interface mobile phone 102 from the mobile device pairing server 106. At block 480, the process 400 deactivates operational capabilities of the audio-only user interface mobile phone 102. For example, the audio-only user interface mobile phone 102 may be configured with a circuit-board level fuse that may be blown or otherwise disconnected. Many other possibilities exist for rendering audio-only user interface mobile phone 102 inoperative and all are considered within the scope of the present subject matter. The process 400 ends at block 482 and the audio-only user interface mobile phone 102 is rendered unusable by a thief or finder of the audio-only user interface mobile phone 102.

As such, the process 400 provides audio-based input command processing and output processing in response to messages from a mobile device pairing server, such as the mobile device pairing server 106. The process 400 performs a variety of example processing associated with an audio-only user interface mobile phone that may be paired and synchronized with a display-based mobile phone. While the example processing has been shown and described for purposes or representation of possible implementations of processing for an audio-only user interface mobile phone to be paired and synchronized with a display-based mobile phone, many other possibilities exist for processing associated with such pairing and synchronizing and all are considered within the scope of the present subject matter.

Thus, in accord with certain implementations, a method of pairing an audio-only user interface mobile phone with a display-based mobile phone via a shared unified single telephone number involves capacitively detecting a human hand contact on an enclosure of the audio-only user interface mobile phone; sending, in response to the capacitive detection of the human hand contact on the enclosure of the audio-only user interface mobile phone, a synchronization request message to a mobile device pairing server; synchronizing address book content information and an input command set via the audio-only user interface mobile phone with a mobile device pairing server, such that the address book content information and the input command set of the audio-only user interface mobile phone are synchronized with the display-based mobile phone and the audio-only user interface mobile phone is synchronized with the display-based mobile phone via the shared unified single telephone number; storing the synchronized address book content information and the synchronized input command set; detecting audio voice input information; generating text input information via audio-to-text conversion of the detected audio voice input information; identifying a command associated with the stored input command set within the generated text input information; generating audio output confirming that processing associated with the identified command is in process; determining that the identified command includes a command to send a text message to a contact associated with the address book content information; identifying the contact and text message content within the detected audio voice input information; identifying contact information for the contact within the stored address book content information; and sending the text message to the contact including the identified text message content using the identified contact information.

In certain implementations, a method of pairing an audio-only user interface mobile phone with a display-based mobile phone via a shared unified single telephone number involves synchronizing address book content information and an input command set via the audio-only user interface mobile phone with a mobile device pairing server, such that the address book content information and the input command set of the audio-only user interface mobile phone are synchronized with the display-based mobile phone and the audio-only user interface mobile phone is synchronized with the display-based mobile phone via the shared unified single telephone number; storing the synchronized address book content information and the synchronized input command set; detecting audio voice input information; identifying a command associated with the stored input command set within the detected audio voice input information; processing the identified command; and generating audio output confirming that processing associated with the identified command is in process.

In certain implementations, the method of pairing an audio-only user interface mobile phone with a display-based mobile phone via a shared unified single telephone number further involves capacitively detecting a human hand contact on an enclosure of the audio-only user interface mobile phone; and the method of synchronizing the address book content information and the input command set via the audio-only user interface mobile phone with the mobile device pairing server involves synchronizing the address book content information and the input command set via the audio-only user interface mobile phone with the mobile device pairing server in response to the capacitive detection of the human hand contact on the enclosure of the audio-only user interface mobile phone. In certain implementations, the method of identifying the command associated with the stored input command set within the detected audio voice input information involves generating text input information via audio-to-text conversion of the detected audio voice input information; and identifying the command within the generated text input information. In certain implementations, the method of identifying the command associated with the stored input command set within the detected audio voice input information involves generating recognized speech information via speech recognition processing of the detected audio voice input information; and identifying the command within the generated recognized speech information. In certain implementations, the method further involves determining that the identified command includes a command to send a text message to a contact associated with the address book content information; identifying the contact and text message content within the detected audio voice input information; identifying contact information for the contact within the stored address book content information; and the method of processing the identified command involves sending the text message to the contact including the identified text message content using the identified contact information. In certain implementations, the method further involves determining that the identified command includes a command to perform a search via the Internet; identifying search string content via audio-to-text conversion of the detected audio voice input information; performing the Internet search via the mobile device pairing server using the audio-to-text converted search string content; receiving search result content from the mobile device pairing server; converting the received search result content to audio search result content via text-to-speech conversion of the received search result content; and outputting the audio search result content. In certain implementations, the method further involves receiving an instruction from the mobile device pairing server to terminate active operation of the audio-only user interface mobile phone; synchronizing changed address book content information via the audio-only user interface mobile phone with the mobile device pairing server; and entering a synchronization detection mode, where the synchronization detection mode includes one of a capacitive detection of a human hand synchronization detection mode and a voice command synchronization detection mode. In certain implementations, the method further involves determining that the identified command includes a command to switch incoming call ring activity from the audio-only user interface mobile phone to the paired display-based mobile phone; and sending a message to the mobile device pairing server to ring the paired display-based mobile phone for incoming calls to the shared unified single telephone number. In certain implementations, the method further involves receiving an instruction from the mobile device pairing server to render the audio-only user interface mobile phone inoperable; deleting the address book content information and the shared unified single telephone number from the audio-only user interface mobile phone; disconnecting the audio-only user interface mobile phone from the mobile device pairing server; and deactivating operational capabilities of the audio-only user interface mobile phone.

In another implementation, a computer readable storage medium may store instructions which, when executed on one or more programmed processors, carry out a process of pairing an audio-only user interface mobile phone with a display-based mobile phone via a shared unified single telephone number involving synchronizing address book content information and an input command set via the audio-only user interface mobile phone with a mobile device pairing server, such that the address book content information and the input command set of the audio-only user interface mobile phone are synchronized with the display-based mobile phone and the audio-only user interface mobile phone is synchronized with the display-based mobile phone via the shared unified single telephone number; storing the synchronized address book content information and the synchronized input command set; detecting audio voice input information; identifying a command associated with the stored input command set within the detected audio voice input information; processing the identified command; and generating audio output confirming that processing associated with the identified command is in process.

An audio-only user interface mobile phone for pairing with a display-based mobile phone via a shared unified single telephone number, consistent with certain implementations, has a memory that stores device pairing information; an audio input device; an audio output device; and a processor programmed to synchronize address book content information and an input command set with a mobile device pairing server, such that the address book content information and the input command set of the audio-only user interface mobile phone are synchronized with the display-based mobile phone and the audio-only user interface mobile phone is synchronized with the display-based mobile phone via the shared unified single telephone number; store the synchronized address book content information and the synchronized input command set in the memory; detect audio voice input information via the audio input device; identify a command associated with the stored input command set within the detected audio voice input information; process the identified command; and generate audio output via the audio output device confirming that processing associated with the identified command is in process.

In certain implementations, the processor is further programmed to capacitively detect a human hand contact on an enclosure of the audio-only user interface mobile phone; and, in being programmed to synchronize the address book content information and the input command set with the mobile device pairing server, the processor is programmed to synchronize the address book content information and the input command set with the mobile device pairing server in response to the capacitive detection of the human hand contact on the enclosure. In certain implementations, in being programmed to identify the command associated with the stored input command set within the detected audio voice input information, the processor is programmed to generate text input information via audio-to-text conversion of the detected audio voice input information; and identify the command within the generated text input information. In certain implementations, in being programmed to identify the command associated with the stored input command set within the detected audio voice input information, the processor is programmed to generate recognized speech information via speech recognition processing of the detected audio voice input information; and identify the command within the generated recognized speech information. In certain implementations, the processor is further programmed to determine that the identified command comprises a command to send a text message to a contact associated with the address book content information; identify the contact and text message content within the detected audio voice input information; identify contact information for the contact within the stored address book content information; and, in being programmed to process the identified command, the processor is programmed to send the text message to the contact including the identified text message content using the identified contact information. In certain implementations, the processor is further programmed to determine that the identified command includes a command to perform a search via the Internet; identify search string content via audio-to-text conversion of the detected audio voice input information; perform the Internet search via the mobile device pairing server using the audio-to-text converted search string content; receive search result content from the mobile device pairing server; convert the received search result content to audio search result content via text-to-speech conversion of the received search result content; and output the audio search result content via the audio output device. In certain implementations, the processor is further programmed to receive an instruction from the mobile device pairing server to terminate active operation; synchronize changed address book content information with the mobile device pairing server; and enter a synchronization detection mode, where the synchronization detection mode includes one of a capacitive detection of a human hand synchronization detection mode and a voice command synchronization detection mode. In certain implementations, the processor is further programmed to determine that the identified command includes a command to switch incoming call ring activity to the paired display-based mobile phone; and send a message to the mobile device pairing server to ring the paired display-based mobile phone for incoming calls to the shared unified single telephone number. In certain implementations, the processor is further programmed to receive an instruction from the mobile device pairing server to be rendered inoperable; delete the address book content information and the shared unified single telephone number; disconnect from the mobile device pairing server; and deactivate operational capabilities.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of pairing an audio-only user interface mobile phone with a display-based mobile phone via a shared unified single telephone number, comprising:
   capacitively detecting a human hand contact on an enclosure of the audio-only user interface mobile phone;
   sending, in response to the capacitive detection of the human hand contact on the enclosure of the audio-only user interface mobile phone, a synchronization request message to a mobile device pairing server;
   synchronizing address book content information and an input command set via the audio-only user interface mobile phone with a mobile device pairing server, such that the address book content information and the input command set of the audio-only user interface mobile phone are synchronized with the display-based mobile phone and the audio-only user interface mobile phone is synchronized with the display-based mobile phone via the shared unified single telephone number;
   storing the synchronized address book content information and the synchronized input command set;
   detecting audio voice input information;
   generating text input information via audio-to-text conversion of the detected audio voice input information;
   identifying a command associated with the stored input command set within the generated text input information;
   generating audio output confirming that processing associated with the identified command is in process;
   determining that the identified command comprises a command to send a text message to a contact associated with the address book content information;
   identifying the contact and text message content within the detected audio voice input information;
   identifying contact information for the contact within the stored address book content information; and
   sending the text message to the contact comprising the identified text message content using the identified contact information.

2. A method of pairing an audio-only user interface mobile phone with a display-based mobile phone via a shared unified single telephone number, comprising:
   synchronizing address book content information and an input command set via the audio-only user interface mobile phone with a mobile device pairing server, such that the address book content information and the input command set of the audio-only user interface mobile phone are synchronized with the display-based mobile phone and the audio-only user interface mobile phone is synchronized with the display-based mobile phone via the shared unified single telephone number;
   storing the synchronized address book content information and the synchronized input command set;
   detecting audio voice input information;
   identifying a command associated with the stored input command set within the detected audio voice input information;

processing the identified command; and
generating audio output confirming that processing associated with the identified command is in process.

3. The method according to claim 2, further comprising:
capacitively detecting a human hand contact on an enclosure of the audio-only user interface mobile phone; and
where synchronizing the address book content information and the input command set via the audio-only user interface mobile phone with the mobile device pairing server comprises synchronizing the address book content information and the input command set via the audio-only user interface mobile phone with the mobile device pairing server in response to the capacitive detection of the human hand contact on the enclosure of the audio-only user interface mobile phone.

4. The method according to claim 2, where identifying the command associated with the stored input command set within the detected audio voice input information comprises:
generating text input information via audio-to-text conversion of the detected audio voice input information; and
identifying the command within the generated text input information.

5. The method according to claim 2, where identifying the command associated with the stored input command set within the detected audio voice input information comprises:
generating recognized speech information via speech recognition processing of the detected audio voice input information; and
identifying the command within the generated recognized speech information.

6. The method according to claim 2, further comprising:
determining that the identified command comprises a command to send a text message to a contact associated with the address book content information;
identifying the contact and text message content within the detected audio voice input information;
identifying contact information for the contact within the stored address book content information; and
where processing the identified command comprises sending the text message to the contact comprising the identified text message content using the identified contact information.

7. The method according to claim 2, further comprising:
determining that the identified command comprises a command to perform a search via the Internet;
identifying search string content via audio-to-text conversion of the detected audio voice input information;
performing the Internet search via the mobile device pairing server using the audio-to-text converted search string content;
receiving search result content from the mobile device pairing server;
converting the received search result content to audio search result content via text-to-speech conversion of the received search result content; and
outputting the audio search result content.

8. The method according to claim 2, further comprising:
receiving an instruction from the mobile device pairing server to terminate active operation of the audio-only user interface mobile phone;
synchronizing changed address book content information via the audio-only user interface mobile phone with the mobile device pairing server; and
entering a synchronization detection mode, where the synchronization detection mode comprises one of a capacitive detection of a human hand synchronization detection mode and a voice command synchronization detection mode.

9. The method according to claim 2, further comprising:
determining that the identified command comprises a command to switch incoming call ring activity from the audio-only user interface mobile phone to the paired display-based mobile phone; and
sending a message to the mobile device pairing server to ring the paired display-based mobile phone for incoming calls to the shared unified single telephone number.

10. The method according to claim 2, further comprising:
receiving an instruction from the mobile device pairing server to render the audio-only user interface mobile phone inoperable;
deleting the address book content information and the shared unified single telephone number from the audio-only user interface mobile phone;
disconnecting the audio-only user interface mobile phone from the mobile device pairing server; and
deactivating operational capabilities of the audio-only user interface mobile phone.

11. A computer readable storage medium storing instructions which, when executed on one or more programmed processors, carry out a method according to claim 2.

12. An audio-only user interface mobile phone for pairing with a display-based mobile phone via a shared unified single telephone number, comprising:
a memory that stores device pairing information;
an audio input device;
an audio output device; and
a processor programmed to:
synchronize address book content information and an input command set with a mobile device pairing server, such that the address book content information and the input command set of the audio-only user interface mobile phone are synchronized with the display-based mobile phone and the audio-only user interface mobile phone is synchronized with the display-based mobile phone via the shared unified single telephone number;
store the synchronized address book content information and the synchronized input command set in the memory;
detect audio voice input information via the audio input device;
identify a command associated with the stored input command set within the detected audio voice input information;
process the identified command; and
generate audio output via the audio output device confirming that processing associated with the identified command is in process.

13. The audio-only user interface mobile phone according to claim 12, where the processor is further programmed to:
capacitively detect a human hand contact on an enclosure of the audio-only user interface mobile phone; and
where, in being programmed to synchronize the address book content information and the input command set with the mobile device pairing server, the processor is programmed to synchronize the address book content information and the input command set with the mobile device pairing server in response to the capacitive detection of the human hand contact on the enclosure.

14. The audio-only user interface mobile phone according to claim 12, where, in being programmed to identify the command associated with the stored input command set within the detected audio voice input information, the processor is programmed to:
generate text input information via audio-to-text conversion of the detected audio voice input information; and
identify the command within the generated text input information.

15. The audio-only user interface mobile phone according to claim 12, where, in being programmed to identify the command associated with the stored input command set within the detected audio voice input information, the processor is programmed to:
generate recognized speech information via speech recognition processing of the detected audio voice input information; and
identify the command within the generated recognized speech information.

16. The audio-only user interface mobile phone according to claim 12, where the processor is further programmed to:
determine that the identified command comprises a command to send a text message to a contact associated with the address book content information;
identify the contact and text message content within the detected audio voice input information;
identify contact information for the contact within the stored address book content information; and
where, in being programmed to process the identified command, the processor is programmed to send the text message to the contact comprising the identified text message content using the identified contact information.

17. The audio-only user interface mobile phone according to claim 12, where the processor is further programmed to:
determine that the identified command comprises a command to perform a search via the Internet;
identify search string content via audio-to-text conversion of the detected audio voice input information;
perform the Internet search via the mobile device pairing server using the audio-to-text converted search string content;
receive search result content from the mobile device pairing server;
convert the received search result content to audio search result content via text-to-speech conversion of the received search result content; and
output the audio search result content via the audio output device.

18. The audio-only user interface mobile phone according to claim 12, where the processor is further programmed to:
receive an instruction from the mobile device pairing server to terminate active operation;
synchronize changed address book content information with the mobile device pairing server; and
enter a synchronization detection mode, where the synchronization detection mode comprises one of a capacitive detection of a human hand synchronization detection mode and a voice command synchronization detection mode.

19. The audio-only user interface mobile phone according to claim 12, where the processor is further programmed to:
determine that the identified command comprises a command to switch incoming call ring activity to the paired display-based mobile phone; and
send a message to the mobile device pairing server to ring the paired display-based mobile phone for incoming calls to the shared unified single telephone number.

20. The audio-only user interface mobile phone according to claim 12, where the processor is further programmed to:
receive an instruction from the mobile device pairing server to be rendered inoperable;
delete the address book content information and the shared unified single telephone number;
disconnect from the mobile device pairing server; and
deactivate operational capabilities.

* * * * *